(12) United States Patent
Gueta et al.

(10) Patent No.: US 10,176,798 B2
(45) Date of Patent: Jan. 8, 2019

(54) FACILITATING DYNAMIC AND INTELLIGENT CONVERSION OF TEXT INTO REAL USER SPEECH

(71) Applicant: INTEL IP CORPORATION, Santa Clara, CA (US)

(72) Inventors: Ofer Gueta, Ganei-Tikva (IL); Sefi Kraemer, Ein Carmel (IL)

(73) Assignee: INTEL CORPORATION, Santa Clara, CA (US)

( * ) Notice: Subject to any disclaimer, the term of this patent is extended or adjusted under 35 U.S.C. 154(b) by 156 days.

(21) Appl. No.: 14/839,454

(22) Filed: Aug. 28, 2015

(65) Prior Publication Data

US 2017/0061955 A1    Mar. 2, 2017

(51) Int. Cl.
*G10L 13/04* (2013.01)
*H04M 1/725* (2006.01)

(52) U.S. Cl.
CPC ......... *G10L 13/04* (2013.01); *H04M 1/72519* (2013.01)

(58) Field of Classification Search
CPC ............................ G10L 13/04; H04M 1/72519
USPC ....................................................... 704/260
See application file for complete search history.

(56) References Cited

U.S. PATENT DOCUMENTS

| 6,446,040 | B1 | 9/2002 | Socher et al. | |
|---|---|---|---|---|
| 2004/0225504 | A1 | 11/2004 | Cutaia | |
| 2007/0078656 | A1* | 4/2007 | Niemeyer | G10L 13/02 704/260 |
| 2008/0235024 | A1* | 9/2008 | Goldberg | G10L 13/033 704/260 |
| 2009/0198497 | A1 | 8/2009 | Kwon | |
| 2009/0254345 | A1* | 10/2009 | Fleizach | G10L 13/043 704/260 |

OTHER PUBLICATIONS

PCT/US2016/042470 Notification of Transmittal and the International Search Report and the Written Opinion of the International Searching Authority, or the Declaration, 11 pages, dated Sep. 12, 2016.

* cited by examiner

*Primary Examiner* — Bharatkumar S Shah
(74) *Attorney, Agent, or Firm* — Womble Bond Dickinson (US) LLP

(57) ABSTRACT

A mechanism is described for facilitating dynamic and intelligent conversion of text into real user speech according to one embodiment. A method of embodiments, as described herein, includes receiving a textual message from a first user, and accessing a voice profile associated with the first user, where the voice profile includes a real voice of the first user and at least one of emotional patterns relating to the first user, context distinctions relating to the first user, and speech characteristics relating to the first user, where accessing further includes extracting the real voice and at least one of an emotional pattern, a context distinction, and a speech characteristic based on subject matter of the textual message. The method may further include converting the textual message into a real speech of the first user based on the voice profile including the real voice and at least one of the emotional pattern, the context distinction, and the speech characteristic.

25 Claims, 7 Drawing Sheets

FACILITATING DYNAMIC AND INTELLIGENT CONVERSION OF TEXT INTO REAL USER SPEECH

FIELD

Embodiments described herein generally relate to computers. More particularly, embodiments relate to facilitating dynamic and intelligent conversion of text into real user speech.

BACKGROUND

It is fairly common for users of computing devices, such as mobile computers, to communicate through textual messaging (e.g., emails, short message service (SMS) messages, instant messages through instant messaging (IM), etc.). Some conventional techniques allow for converting text into voice; however, such techniques are severely limited to synthetic robot-like voices which, in turn, means all texts, when converted into speech, sound alike. Stated differently, with their dependence on the same synthetic robot-like voice, conventional techniques are indifferent to the voice of the original sender and thus, these techniques fail to distinguish between the original senders of messages.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a novel technique for converting a textual message into a voice of the sender of the textual message. In one embodiment, voice profiles of potential senders may be kept and maintained at a database to then be used to convert a text into its corresponding speech, such as the sender's voice, without having the sender speak the actual text (unlike voice messaging where the sender leaves a voice message in own voice).

Embodiments further provide for an intelligent conversion of text into the sender's voice such that along with the sender's voice, the sender's voice pitch/depth, speech characteristics, emotional nuances, and/or the like, are also taken into consideration and incorporated into the conversion.

As aforementioned, convention techniques are severely limited as they are indifferent to the senders' voice (and other relevant characteristics) and merely provide a synthetic robot-like voice for all messages. Some techniques provide some variety in terms of male voice, female voice, preferred accent, but again, none of these techniques use the actual sender's voice and additionally, do not take into consideration any of the other relevant characteristics of the sender.

It is contemplated and to be noted that embodiments are not limited to any particular number and type of software applications, application services, customized settings, etc., or any particular number and type of computing devices, networks, deployment details, etc.; however, for the sake of brevity, clarity, and ease of understanding, throughout this document, references are made to text-to-speech conversions, voice profiles, speech characteristics, software applications, user preferences, customized settings, mobile computers (e.g., smartphones, tablet computers, etc.), communication medium/network (e.g., cloud network, the Internet, proximity network, Bluetooth, etc.), but that embodiments are not limited as such.

Figure 1:
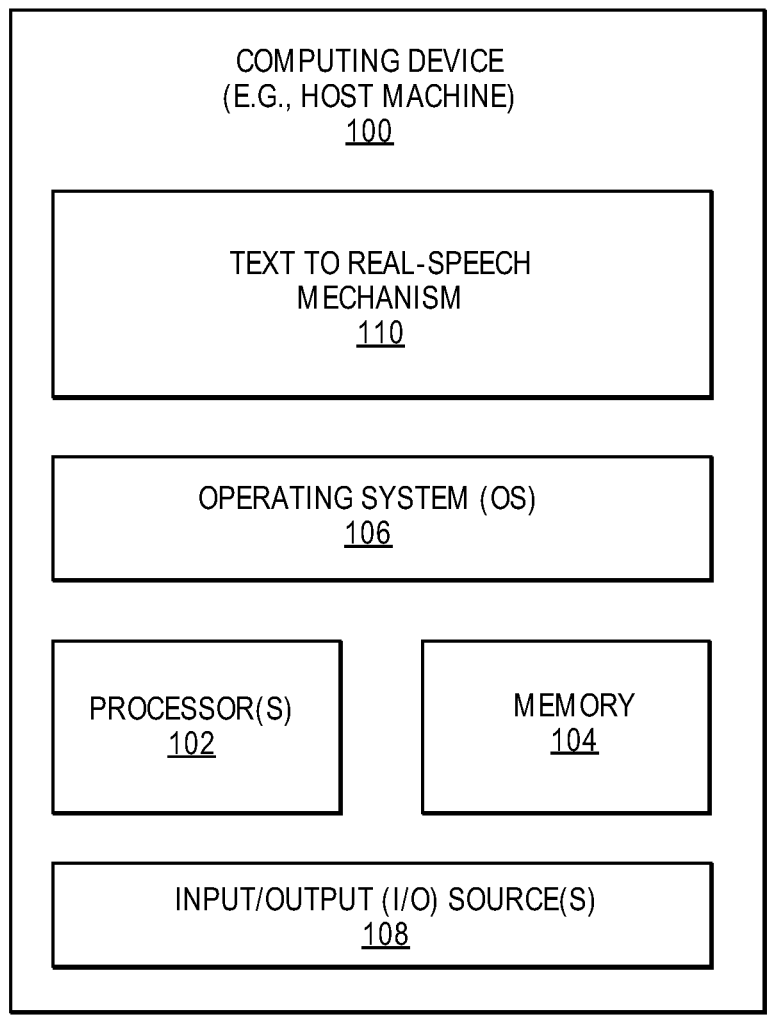
FIG. 1 illustrates a computing device employing a text to real-speech conversion mechanism according to one embodiment.
Figure 2:
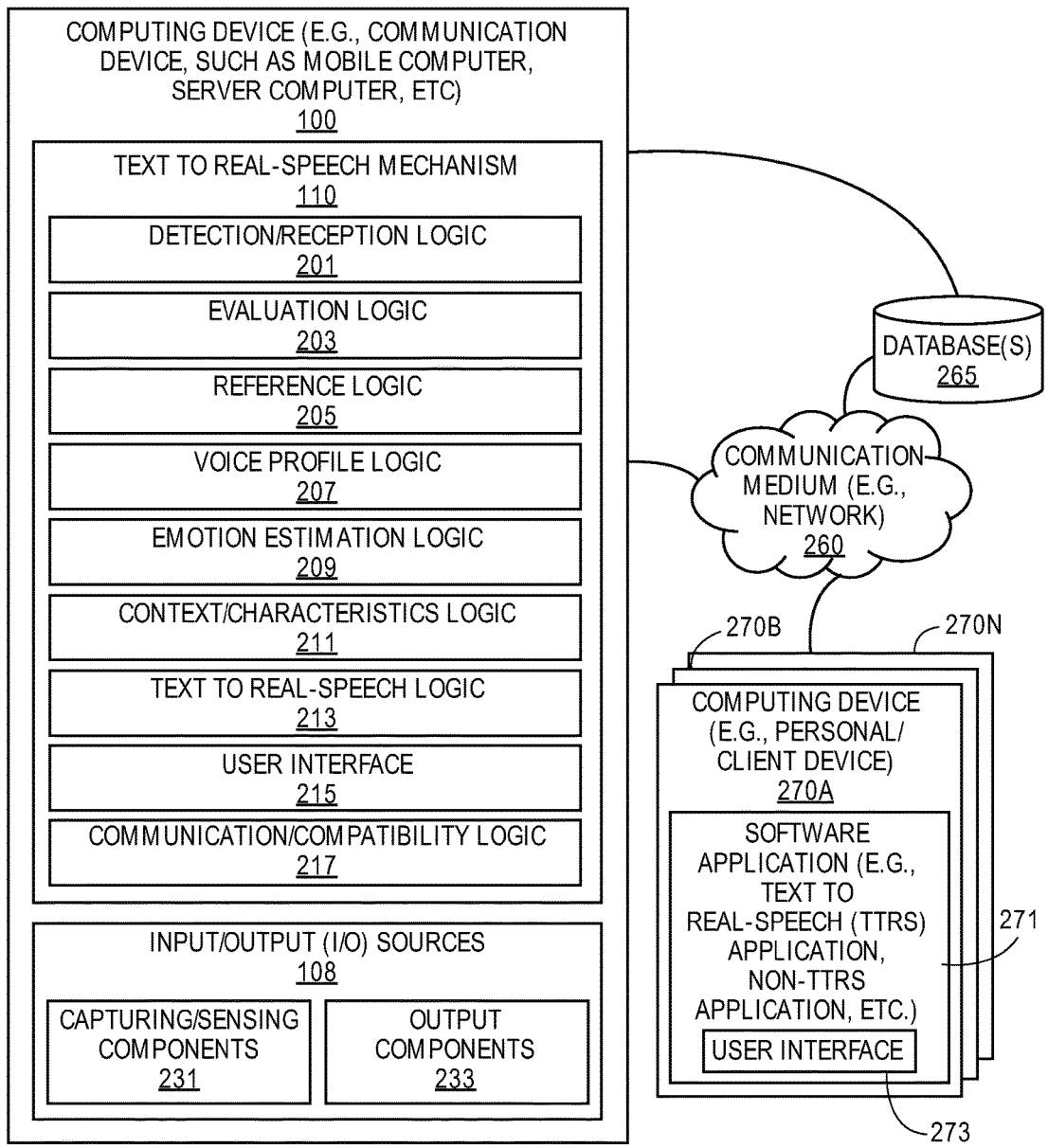
FIG. 2 illustrates a text to real-speech conversion mechanism according to one embodiment.

FIG. 1 illustrates a computing device 100 employing a text to real-speech conversion mechanism 110 according to one embodiment. Computing device 100 serves as a host machine for hosting text to real-speech ("TTRS") conversion mechanism ("TTRS mechanism", "RS mechanism", or "real-speech mechanism") 110 that includes any number and type of components, as illustrated in FIG. 2, to facilitate dynamic and real-time conversion of textual messages into real and true speech associated with actual senders, as will be further described throughout this document.

Computing device 100 may include any number and type of data processing devices, such as large computing systems, such as server computers, desktop computers, etc., and may further include set-top boxes (e.g., Internet-based cable television set-top boxes, etc.), global positioning system (GPS)-based devices, etc. Computing device 100 may include mobile computing devices serving as communication devices, such as cellular phones including smartphones, personal digital assistants (PDAs), tablet computers, laptop computers (e.g., Ultrabook™ system, etc.), e-readers, media internet devices (MIDs), media players, smart televisions, television platforms, intelligent devices, computing dust, media players, head-mounted displays (HMDs) (e.g., wearable glasses, such as Google® Glass™, head-mounted binoculars, gaming displays, military headwear, etc.), and other wearable devices (e.g., smart watches, bracelets, smartcards, jewelry, clothing items, etc.), and/or the like.

Computing device 100 may include an operating system (OS) 106 serving as an interface between hardware and/or physical resources of the computer device 100 and a user. Computing device 100 further includes one or more processor(s) 102, memory devices 104, network devices, drivers, or the like, as well as input/output (I/O) sources 108, such as touchscreens, touch panels, touch pads, virtual or regular keyboards, virtual or regular mice, etc.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", "code", "software code", and the like, may be used interchangeably throughout this document. Also, terms like "job", "input", "request", "message", and the like, may be used interchangeably throughout this document. It is contemplated that the term "user" may refer to an individual or a group of individuals using or having access to computing device 100.

FIG. 2 illustrates a text to real-speech conversion mechanism 110 according to one embodiment. In one embodiment, real-speech mechanism 110 may include any number and type of components, such as (without limitation): detection/reception logic 201; evaluation logic 203; preferences logic 205, voice profile logic ("profile logic") 207; emotion estimation logic ("emotion logic") 209; context/characteristics logic 211; text to real-speech logic ("TTRS logic", "RS logic", or "real-speech logic") 213; user interface 215; and communication/compatibility logic 217.

In one embodiment, real-speech mechanism 110 may be hosted by computing device 100, such as a communication device including a mobile computer (e.g., smartphone, tablet computer, etc.), wearable computer (e.g., wearable glasses, smart bracelets, smartcards, smart watches, HMDs, etc.), and/or the like. In another embodiment, computing device 100 may be a larger communication machine, such as a server computer, a desktop computer, a laptop computer, etc., that is in communication with one or more smaller computing devices 270A, 270B, 270N (e.g., mobile computer, such as a smartphone, a tablet computer, etc.) over communication medium 260, such as one or more networks (e.g., Cloud network, the Internet, proximity network, such as Bluetooth, etc.).

For example and in one embodiment, computing device 100 may serve as a server computer hosting real-speech mechanism 110 in its entirety while communicating one or more services offered by real-speech mechanism 110 with one or more personal devices, such as computing devices 270A-N, over communication medium 260, such as a cloud network. In another embodiment, computing device 100 may be another personal device, such as the same as one of computing devices 270A-N, where each computing device 100, 270A-N may include real-speech mechanism 110, either partially or entirely, as part of or in support of software application ("application") 271 which include a text to real-speech application ("TTRS application" or "real-speech application") or any other form of software application (e.g., email application, SMS application, IM application, etc.) that allows for communication of textual message, but application 271 may not be a TTRS application. For example, computing device 270A serving as a sending user's personal device may not have a TTRS application, but may still be able to help understand the context and emotions of a textual message when it is written and communicated to a receiving user's computing device, such as computing device 100. In other words, for example, sender's computing device 270A may not be capable to perform TTRS on its end using application 271 at computing device 270A, but may still be able to support the context and/or emotion collection, estimation, etc., when sending a textual message to a receiving device, such as computing device 100, so that the receiver having access to computing device 100 may yet benefit from TTRS.

In one embodiment, as aforementioned, application 271 may be a client-based TTRS application that is downloadable over communication medium 260 (e.g., cloud network, the Internet, proximity network, etc.), where TTRS is implemented and supported such that where various relevant tasks and features relating to TTRS are independently offered and accessed through user interface 273 (e.g., mobile application interface, web browser, etc.). In another embodiment, application 271 may not be TTRS-implemented application, but may still be capable of supporting the context and emotion estimation, collection, gathering, etc., such as when sending a textual message to a receiving device, such as computing device 100, so that the receiving user at computing device 100 may yet benefit from TTRS.

Computing device 100 may include I/O source(s) 108 including capturing/sensing components 231 and output components 233 which, as will be further described below, may also include any number and type of components, sensor arrays, detectors, displays, etc. For example, capturing/sensing components 231 may include (without limitation) two-dimensional (2D) cameras, three-dimensional (3D) cameras, sensors array, microphones, etc., while, output components 233 may include (without limitation) display screens, display/projection areas, projectors, speakers, etc. For example, in some embodiments, a sensors array may include any number and type of sensors capable of being used for TTRS purposes, such as body-sensors, text-input sensors capable of sensing the force of punching letters to help decipher the mood or estimate emotional state of a sending user during the user's writing of a textual message, and/or the like.

Computing devices 100, 270A-N may be further in communication with one or more repositories or data sources or databases, such as database(s) 265, to obtain, communicate, store, and maintain any amount and type of data (e.g., user voice profiles, user context/characteristics, user emotional patterns, user feedback, location-related information, media, metadata, templates, real-time data, historical contents, user statistical data, user and/or device identification tags and other information, resources, policies, criteria, rules, regulations, upgrades, etc.). For example, user statistical data may include data relating to how fast a receiving user reacts and responds to a message received from a sending user which may help determine the receiving user's emotional state or mood and similarly, the receiving user's mood changes during a particular time of day or when receiving messages from particular sending users, etc.

In some embodiments, communication medium 260 may include any number and type of communication channels or networks, such as cloud network, the Internet, intranet, Internet of Things ("IoT"), proximity network, such as body network, device-to-device network, peer-to-peer network, Bluetooth, etc. It is contemplated that embodiments are not limited to any particular number or type of computing devices, services or resources, databases, networks, etc.

As with computing device 100, each of computing devices 270A-N may include I/O components 275, such as (without limitation) sensors, detectors, actuators, microphones, speakers, 2D/3D cameras, touchscreens, and/or the like. For example, computing device 100 may include I/O sources 108 having any number and type of capturing/sensing components 231 (e.g., sensor array (such as context/context-aware sensors and environmental sensors, such as camera sensors, ambient light sensors, Red Green Blue (RGB) sensors, movement sensors, etc.), depth sensing cameras, 2D cameras, 3D cameras, image sources, audio/video/signal detectors, microphones, eye/gaze-tracking systems, head-tracking systems, etc.) and output components 233 (e.g., audio/video/signal sources, display planes, display panels, display screens/devices, projectors, display/projection areas, speakers, etc.).

Capturing/sensing components 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing components 231 may further include one or more of supporting or supplemental devices for capturing and/or sensing of data, such as illuminators (e.g., infrared (IR) illuminator), light fixtures, generators, sound blockers, etc.

It is further contemplated that in one embodiment, capturing/sensing components 231 may further include any number and type of context sensors (e.g., linear accelerometer) for sensing or detecting any number and type of contexts (e.g., estimating horizon, linear acceleration, etc., relating to a mobile computing device, etc.). For example, capturing/sensing components 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); gravity gradiometers to study and measure variations in gravitation acceleration due to gravity, etc.

Further, for example, capturing/sensing components 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.), biometric sensors (such as to detect fingerprints, etc.), calendar maintenance and reading device), etc.; global positioning system (GPS) sensors; resource requestor; and trusted execution environment (TEE) logic. TEE logic may be employed separately or be part of resource requestor and/or an I/O subsystem, etc. Capturing/sensing components 231 may further include voice recognition devices, photo recognition devices, facial and other body recognition components, voice-to-text conversion components, etc.

Computing device 100 may further include one or more output components 233 in communication with one or more capturing/sensing components 231 and one or more components of real-speech mechanism 110. Similarly, output components 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output components 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

Referring back to real-speech mechanism 110, for example and in one embodiment, a textual message from personal device 270A is received at computing device 100, where the textual or text message may include any number and type of text-based messages, such as a short message service (SMS) message, an instant message (IM), an email message, etc. Upon detecting or receiving the text message, evaluation logic 203 is triggered to determine various aspects of the text message and traits of the text message's owner or sender, such as who might be the actual sender of the text message. It is contemplated that in one embodiment, a user having access to a computing device, such as the user of personal device 270A, is likely to be the sender of text messages originating from that computing; however, it is contemplated that a user may access someone else's computer or even a work computer, a public computer, etc., which may not be associated with the user having access to it.

In one embodiment, evaluation logic 203 may track the sender's identity based on any number and type of factors, such as sender's phone number, sender's email address, internet protocol (IP) address of the computing device, sender's virtual fingerprints, and/or the like. Once the text message and its sender are identified, evaluation logic 203 may refer to preferences logic 205 to determine any references with regard to user preferences, including general preference with regard to conversion from text to real speech and more specific preferences with regard to this particular sender, text message, time of the day, etc. For example, the user of computing device 100 may access user interface 219 to set any number and type of general and specific preferences relating to TTRS as facilitated by preferences logic 205.

For example, the user may set a preference that all textual messages (regardless of the type (e.g., SMS messages, email messages, etc.), sender identity (e.g., family, friends, work associates, strangers, etc.), and/or the like) received while the user is engaged in driving an automobile are to be converted to the real speech. In contrast, the user may set a preference that all textual message received while the user is sleeping, working, in theater, etc., are not to be converted into speech. Similarly, the user may set other specific preferences, such as regarding individuals (e.g., convert all messages from immediate family members), nature of message (e.g., convert all work-related messages), type of message (e.g., convert SMS messages, but not emails, etc.), status of message (e.g., convert message being read for the first time, but not those being re-read, etc.), and/or the like. It is contemplated that the user may choose to alter these preferences as desired or necessitated by the user, system limitations, network bandwidth, etc.

In one embodiment, upon accessing and reviewing various user preferences stored at database(s) 265 and selecting one or more relevant user preferences as facilitated by preferences logic 207, any relevant data, such as the textual message, the sender identification, the selected one or more preferences, etc., may be forwarded on to profile logic 207 for further processing. In one embodiment, voice profiles associated with various senders may be obtained over time and stored and maintained at one or more repositories, such as database(s) 265, such that a voice profile corresponding to the sender may be selected and to which the textual message by the sender may be converted. For example, converting a textual message into its actual sender's real voice provides for an alive and much more personalized text-to-speech conversion, unlike the robot-like text-to-speech conversions of various conventional techniques. Further, in one embodiment, this novel conversion of the textual message into the sender's real voice is performed based on the senders already-existing voice profile and thus without having to actually require the sender to recite the text, unlike the conventional voice messages.

In one embodiment, a real voice profile generation process may be initiated when a user/sender calls in (using a conventional telephone, a mobile computer, such as personal device 270A, voice over internet protocol (VoIP), such as Skype®, Viber®, etc.), where the sender's voice is captured by a microphone, a sensor, etc., of capturing/sensing components 231. In one embodiment, in case of conference calls, multiple voice profiles corresponding to multiple participants of a conference call may be generated. In another embodiment, voice profile may be generated in a sophisticated voice profile studio with equipment to not only generate a voice profile for the sender, but doing so in a short period of time, such as within a few hours. For example, the sender may voluntarily have their voice profile generated in a dedicated voice profile studio and then forwarded on to the receiving user/receiver having access to computing device 100. It is contemplated, however, that a voice profile may be generated in any number and type of ways ranging from using a simple listening device, such as a microphone, of a receiving device, such as computing device 100, to a more sophisticated voice profile studio. For example, in some embodiments, a voice profile may be generated using a dedicated website, application, or service that specifies a limited-time procedure to create the voice profile, where usually an initial primary voice profile may be created which may then be improved, over a period of time, to a detailed secondary profile that is more versatile, authentic, and based on on-the-fly scenarios. It is contemplated that embodiments are not limited to any particular type of voice profile generation process, method, location, device, component, etc., such that voice profiles may be generated and update over weeks or even years of users/sender calling the receiving device, such as computing device 100 (e.g., smartphone), or by simply listening to the sending user speaking in a sufficiently close proximity to a sensor, employed at computing device 100 or any other device including non-electronic devices, where the sensor is capable of capturing the sender's voice even when not done over an electronic device, such as a call.

Considering the unique qualities, characteristics, idiosyncrasies relating to an individual speech natural patterns, in one embodiment, other factors, such as emotional patterns as facilitated by emotion logic 209, speech contexts and characteristics as facilitated by context/characteristics logic 211, etc., may also be taken into consideration when forming a speech pattern. For example and in one embodiment, by taking into consideration various idiosyncrasies of human speech (such as pitch of the sound when angry, sweetness in voice when speaking in love, frustration over missing a flight, loudness of laugh, tone of speaking while smiling, attempts at speaking when crying, speaking different languages (e.g., English, Hebrew, Spanish, etc.), talking in various accents (e.g., native accent, regional accent, foreign accent, etc.), and/or the like), the voice patterns is transformed from being merely basic voice patterns to more realistic voice patterns which, when used for conversion from their corresponding textual messages, provide for exciting, personalized, and lifelike speech.

In one embodiment, emotional patterns may be detected not only through listening devices, such microphones, but also though various sensors, detectors, cameras, etc., of capturing/sensing components 231. For example, a sensor may sense breathing frequency or even heartbeats of a sender during various moods, such as angry, jolly, sad, etc., to more accurately note this emotional pattern to then be associated with the sender's voice profile. Similarly, for example, emotional patterns may be extracted from other non-voice inputs, such as a camera (e.g., 2D camera, 3D camera, etc.), such as noting the sender's facial expressions, etc., during a video call/conference, such as using FaceTime®, etc.

In one embodiment, as will be further described with reference to FIG. 4A, profile logic 207 may be used to employ one or more processes to obtain user voice profiles, such as by building voice profiles out of a user's contact list either passively by listening in to conversations with these contacts or by the contacts themselves sharing their voice profile that were created on their own devices, such as personal devices 270A-N. For the example, a first user of computing device 100 may request a second user of personal device 270A to allow profile logic 207 at computing device 100 to monitor the voice and speech patterns of the second user during a phone call, in-person conversations, etc. This way a great deal of information regarding the second user's speech may be collected over time which may then be developed into a voice pattern as facilitated by profile logic 207. It is contemplated that some voice profiles may be more developed than other profiles for any number of reasons, such as a user calls more often than other user or who allows their voice to be recorded and observed and developed into a voice profile than other users, and/or the like. It is contemplated that database(s) 265 may also include certain basic user profiles or simply user voices and, in some embodiments, the user voice profiles may be used instead of or in parallel to the basic user voice profiles.

In one embodiment, emotion logic 209 may be triggered to obtain or extract user emotions where such emotions may be used to manipulate the text of textual messages to sound in real intonation of the relevant sender. For example and in one embodiment, various emotional patterns and moods of users (e.g., potential senders, such as family members, friends, work associates, etc.) are obtained over a period of time by listening in to the users, such as via one or more microphones of capturing/sensing components 231, where these speech samples relating to the users are stored at one or more database(s) 265 and then processed by emotion logic 209 to extract emotions from them which may then be used with their corresponding user voice profiles. For example, speech patterns relating to a user are obtained while the user experiences different moods (such as happy, sad, lonely, dejected, angry, disappointing, etc.) and performs various acts relating to the different moods (such as laughing, smiling, screaming, yelling, joking, etc.), where, in one embodiment, emotion logic 209 may then be used to extract emotions from these speech patterns to then be used with voice patterns for conversion of text into real speech.

In one embodiment, context/characteristic logic 211 may be used to extract various contexts and characteristics of user from samples of speech obtained from the user over a period of time, such as when user calls into computing device 100 and one or more microphones of capturing/sensing components 231 are used to listen in. These user speech samples are stored at one or more database(s) 265 so that they may then be used with their corresponding user voice profiles when converting textual messages into real speech. It is contemplated that any number and type of contexts and characteristics relating to a user and/or their speech may be extracted from a human speech, but some of them include (without limitation): voice pitch, voice depth, voice amplitude, native accent, foreign accent, native language, local culture, typical spoken words, specific gestures, and/or the like.

In one embodiment, emotional patterns along with other contexts and characteristics are associated with their corresponding voice profiles to provide a sense of emotional nuance and realistic flavor to each voice profile, such as a textual joke sent by a friend being converted to the friend's voice using the voice profile such that upon conversion, the joke sounds like the friend actually telling the joke. These voice profiles are made available to real-speech logic 213 for further processing. For example, when a textual message is received at computing device 100 from a user/sender having access to personal device 270A, real-speech logic 213 may use a voice profile corresponding to sender to convert the textual message into a real speech of the sender such that the textual message sounds very much like the sender speaking the textual message in own voice and including all the emotional nuances, contextual distinctions, and other characteristics relevant to the sender.

Communication/compatibility logic 217 may be used to facilitate dynamic communication and compatibility between computing devices 100, 270A-N, database(s) 265, communication medium 260, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, the Internet, Internet of Things, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", and the like, may be referenced interchangeably and include, by way of example, software, hardware, and/or any combination of software and hardware, such as firmware. Further, any use of a particular brand, word, term, phrase, name, and/or acronym, such as "text to real speech", "TTRS", "voice pattern", "emotion estimate", "emotional nuance", "context", "contextual distinction", "characteristic", "user", "receiver", "sender", "personal device", "location", "smart device", "mobile computer", "wearable device", etc., should not be read to limit embodiments to software or devices that carry that label in products or in literature external to this document.

It is contemplated that any number and type of components may be added to and/or removed from real-speech mechanism 110 to facilitate various embodiments including adding, removing, and/or enhancing certain features. For brevity, clarity, and ease of understanding of real-speech mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 3:
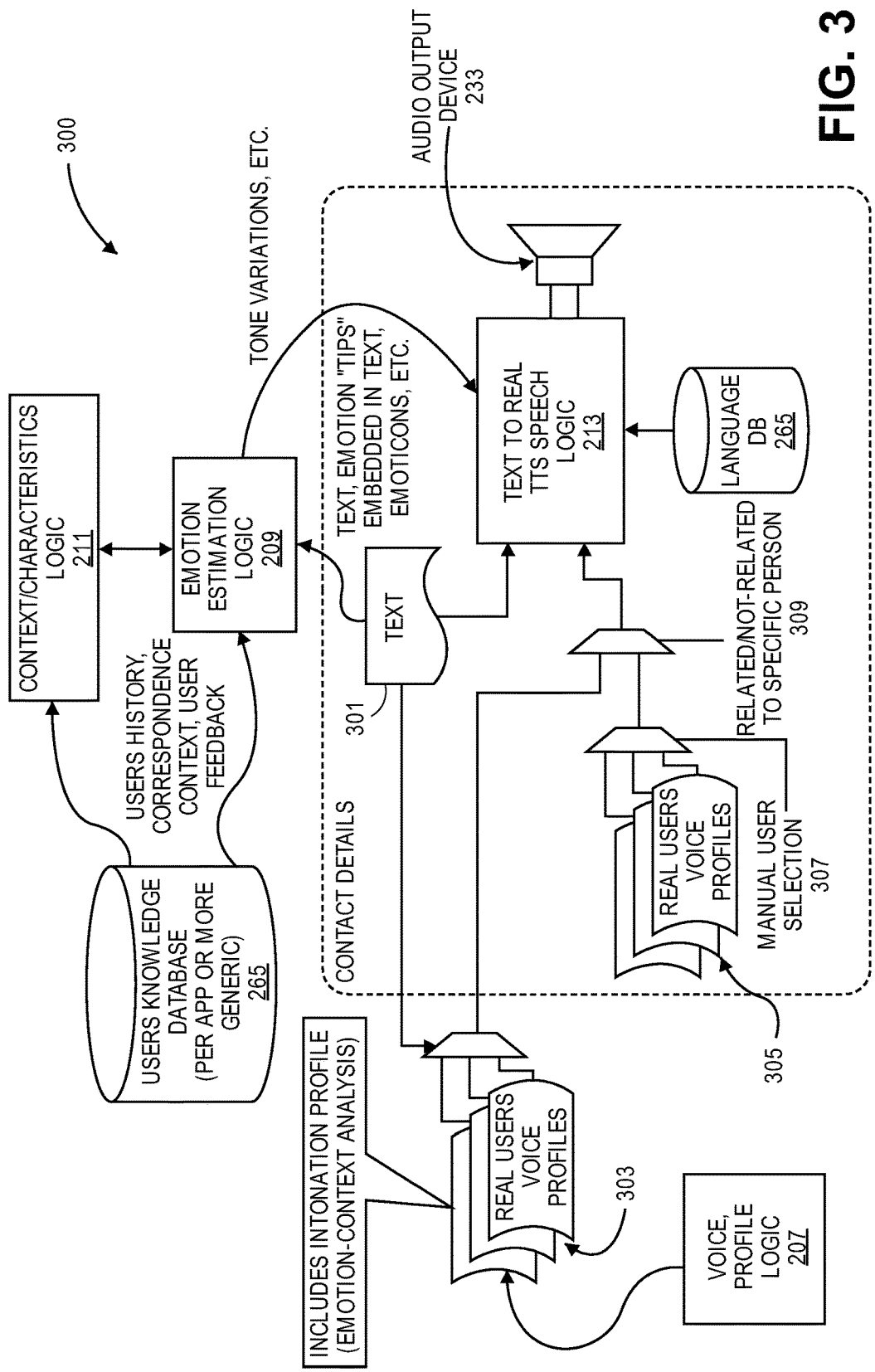
FIG. 3 illustrates an architectural placement according to one embodiment.

FIG. 3 illustrates an architectural placement 300 according to one embodiment. As an initial matter, for brevity, clarity, and ease of understanding, many of the components and processes discussed above with reference to FIGS. 1-2 may not be repeated or discussed hereafter. It is contemplated and to be noted that embodiments are not limited to any particular use case scenario, architectural setup, transaction sequence, etc., and that any number and type of components may be employed, placed, and used in any manner or form to perform the relevant tasks.

In the illustrated embodiment, architectural placement 300 is shown to include voice profile logic 207 to gather real user voice profiles 303 of users (e.g., potential senders of textual messages) which are then associated with user contexts/characteristics and emotional patterns as gathered by context/characteristics logic 211 and emotion estimation logic 209, respectively, where user contexts, characteristics, feedback, voice profiles, etc., may be stored and maintained at database 265. As illustrated, architectural placement 300 may further include pre-defined voice profiles 305 which, through manual user selection 307 and/or related/not-related to specific person selection 309, may be associated with their corresponding voice profiles 303.

As described with reference to FIG. 2, in one embodiment, text 301 sent from a sending computing device, such personal computer 270A, and as placed by a user/sender is received at a receiving computing device, such as computing device 100, as received by a user/receiver may be converted into a real speech as facilitated by real-speech logic 213 based on a real user voice profile (which based on user contexts, characteristics, and/or a pre-defined user profile from pre-defined voice profiles 305) from real users voice profiles 303 corresponding to the sender such that text 301 may sound as like as if the sender is reciting it with all its emotional nuances, context distinctions, and other relevant characteristics.

Figure 4A:
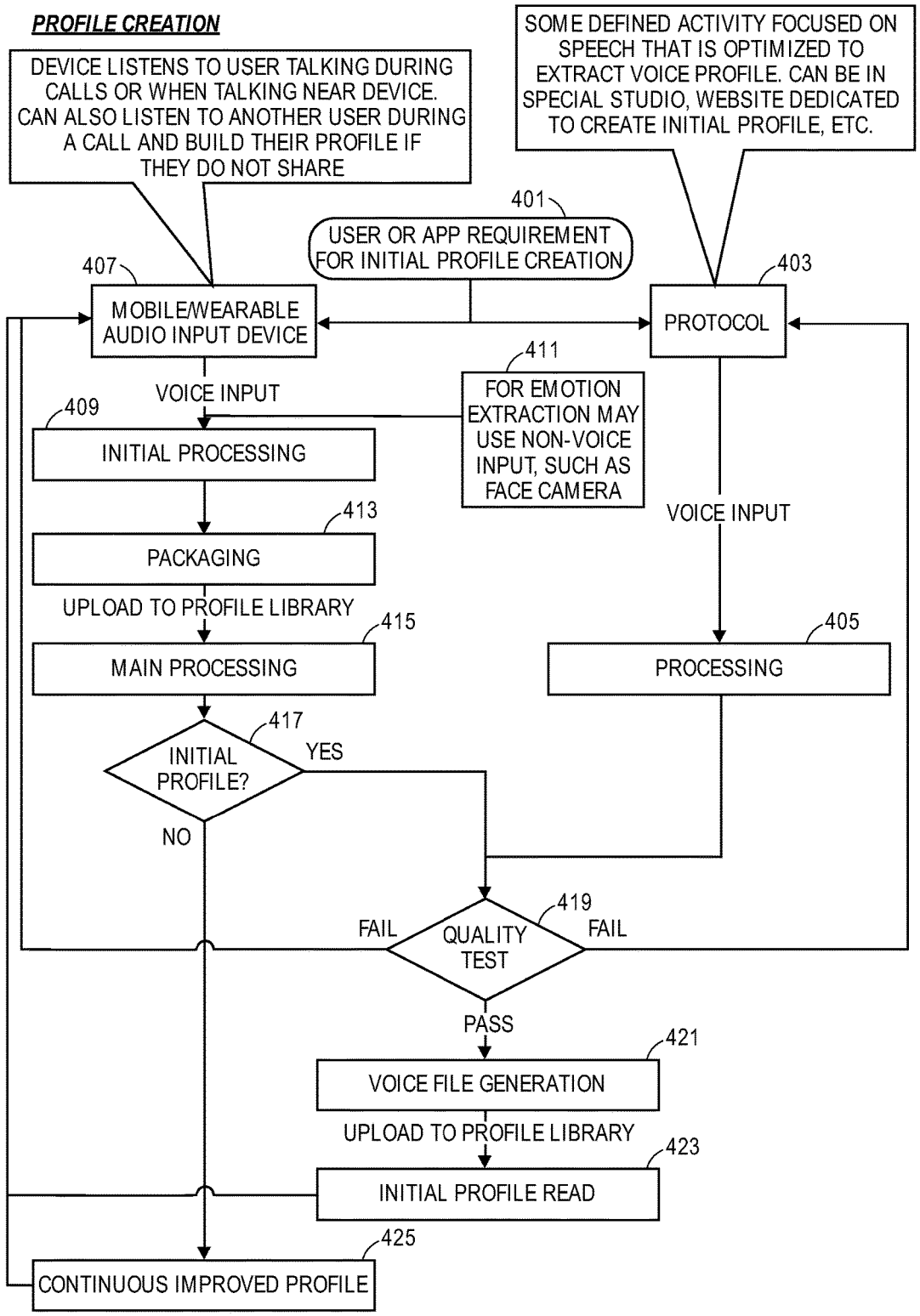
FIG. 4A illustrates a method for creating a voice profile according to one embodiment.

FIG. 4A illustrates a method 400 for creating a voice profile according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed by real-speech mechanism 110 of FIGS. 1-3. The processes of method 400 are illustrated in linear sequences for brevity and clarity in presentation; however, it is contemplated that any number of them can be performed in parallel, asynchronously, or in different orders. For brevity, many of the details discussed with reference to the previous figures may not be discussed or repeated hereafter.

Method 400 begins at block 401 with a user initiates voice profile generation by launching a voice profile generation application or triggering automatic voice profile generation as facilitated by profile logic 207. Upon initiating voice profile generation, at block 403, a voice profile protocol may be triggered as facilitated by profile logic 207, where a defined activity focused on speech is optimized to extract voice profile that is capable of being obtained in special studio or using a voice profile generation application or a website dedicated to creating voice profile, etc., and subsequently, in one embodiment, the voice profile generation process is initiated at block 405. At block 419, a quality test is performed to determine whether the quality of the voice profile is acceptable enough to be used for TTRS conversion. If the quality is determined to be acceptable, a corresponding voice file is generated at block 421 and uploaded into a profile library where the profile is set ready to be initiated and used at block 423. If the quality is determined to be unacceptable, the process returns to block 403 for any necessary adjustments/corrections so that the voice profile generation process may be re-initiated.

As illustrated, in one embodiment, at block 407, an audio input device, such as a microphone, may be used at a computing device (e.g., mobile computer, such as a smartphone, tablet computer) to listen in to the user/sender talking during the call or when talking near the device. For example, the call may have been received at one computing device (such as a smartphone, a tablet computer, etc.), but another computing device (such as another smartphone, another tablet computer, a laptop, etc.) may be used to listen to the sender's voice. Similarly, the computer device may listen to multiple users/senders talking, such as during a conference call having multiple participants, etc.

At block 409, in one embodiment, the voice profile generation process is initiated by receiving voice input, such as by listening to the voice(s) of the user(s)/sender(s), and/or non-voice inputs, such as emotion extraction obtained through an observing camera, etc., at block 411. At block 413, an appropriate packaging of a real user voice profile is performed based on user's voice, emotional patterns, contexts, characteristics, etc., and the packaged voice profile is uploaded to a profile library. At block 415, main processing of the voice profile is performed to determine, at block 417, where the voice profile may serve as an initial voice profile and be associated with its corresponding user/sender. If not, the voice profile may continuously go through improvements at block 425 and method 400 continues at block 407.

If, however, the voice profile is considered an initial voice profile, method 400 continues with a quality test at block 419 to determine whether the voice profile passed a minimal quality to be acceptable enough to be used with TTRS conversions. If the voice profile fails the quality test, method 400 continues at block 407. If, however, the voice profile passes the quality test, voice profile is generated at block 421 and uploaded to the profile library and subsequently, this initial profile is regarded as ready to be used with TTRS conversion at block 423.

Figure 4B:
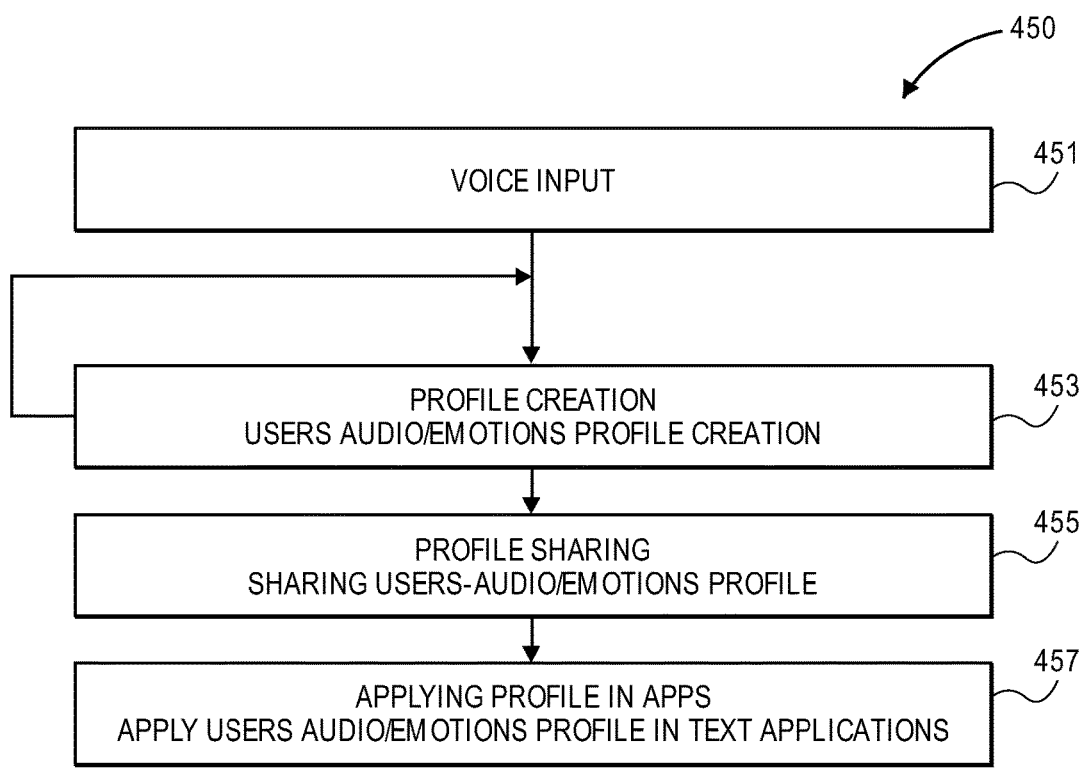
FIG. 4B illustrates a method for facilitating a text to real-speech conversion according to one embodiment.

FIG. 4B illustrates a method 450 for facilitating a text to real-speech conversion according to one embodiment. Method 450 may be performed by processing logic that may comprise hardware (e.g., circuitry, dedicated logic, programmable logic, etc.), software (such as instructions run on a processing device), or a combination thereof. In one embodiment, method 450 may be performed by real-speech mechanism 110 of FIGS. 1-4A. The processes of method 450 are illustrated in linear sequences for brevity and clarity in presentation; however, it is contemplated that any number of them can be performed in parallel, asynchronously, or in different orders. For brevity, many of the details discussed with reference to the previous figures may not be discussed or repeated hereafter.

Method 450 begins at block 451 with receiving a voice input that is used to create a voice profile at block 453, where the voice profile is continuously crated and updated based on new learning about users, their voices, emotions, contexts, characteristics, etc. At block 455, the voice profile is shared with the corresponding user's emotions, contexts, characteristics, etc., with such patterns are associated with the user profile. At block 457, the voice profile is applied to a textual message (e.g., email, SMS, IM, etc.) received from the corresponding user such that the textual message is converted into a real-speech of the user based on the voice profile.

Figure 5:
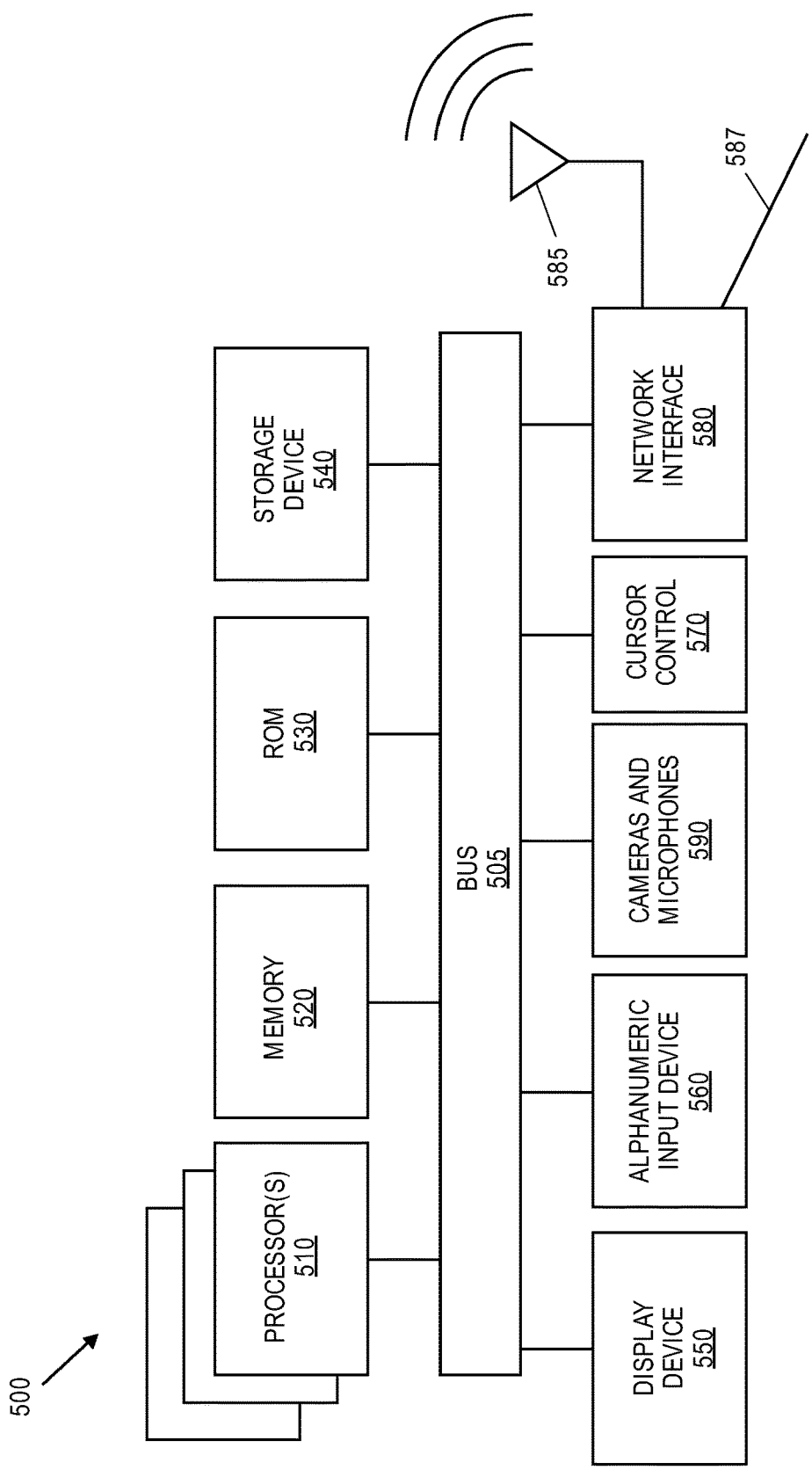
FIG. 5 illustrates computer environment suitable for implementing embodiments of the present disclosure according to one embodiment.

FIG. 5 illustrates an embodiment of a computing system 500 capable of supporting the operations discussed above. Computing system 500 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, wearable devices, etc. Alternate computing systems may include more, fewer and/or different components. Computing device 500 may be the same as or similar to or include computing devices 100 described in reference to FIG. 1.

Computing system 500 includes bus 505 (or, for example, a link, an interconnect, or another type of communication device or interface to communicate information) and processor 510 coupled to bus 505 that may process information. While computing system 500 is illustrated with a single processor, it may include multiple processors and/or co-processors, such as one or more of central processors, image signal processors, graphics processors, and vision processors, etc. Computing system 500 may further include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Computing system 500 may also include read only memory (ROM) and/or other storage device 530 coupled to bus 505 that may store static information and instructions for processor 510. Date storage device 540 may be coupled to bus 505 to store information and instructions. Date storage device 540, such as magnetic disk or optical disc and corresponding drive may be coupled to computing system 500.

Computing system 500 may also be coupled via bus 505 to display device 550, such as a cathode ray tube (CRT), liquid crystal display (LCD) or Organic Light Emitting Diode (OLED) array, to display information to a user. User input device 560, including alphanumeric and other keys, may be coupled to bus 505 to communicate information and command selections to processor 510. Another type of user input device 560 is cursor control 570, such as a mouse, a trackball, a touchscreen, a touchpad, or cursor direction keys to communicate direction information and command selections to processor 510 and to control cursor movement on display 550. Camera and microphone arrays 590 of computer system 500 may be coupled to bus 505 to observe gestures, record audio and video and to receive and transmit visual and audio commands.

Computing system 500 may further include network interface(s) 580 to provide access to a network, such as a local area network (LAN), a wide area network (WAN), a metropolitan area network (MAN), a personal area network (PAN), Bluetooth, a cloud network, a mobile network (e.g., 3$^{rd}$ Generation (3G), etc.), an intranet, the Internet, etc. Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable.

Network interface(s) 580 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 580 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 580 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 500 may vary from implementation to implementation depending upon numerous factors, such as price constraints, performance requirements, technological improvements, or other circumstances. Examples of the electronic device or computer system 500 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 6:
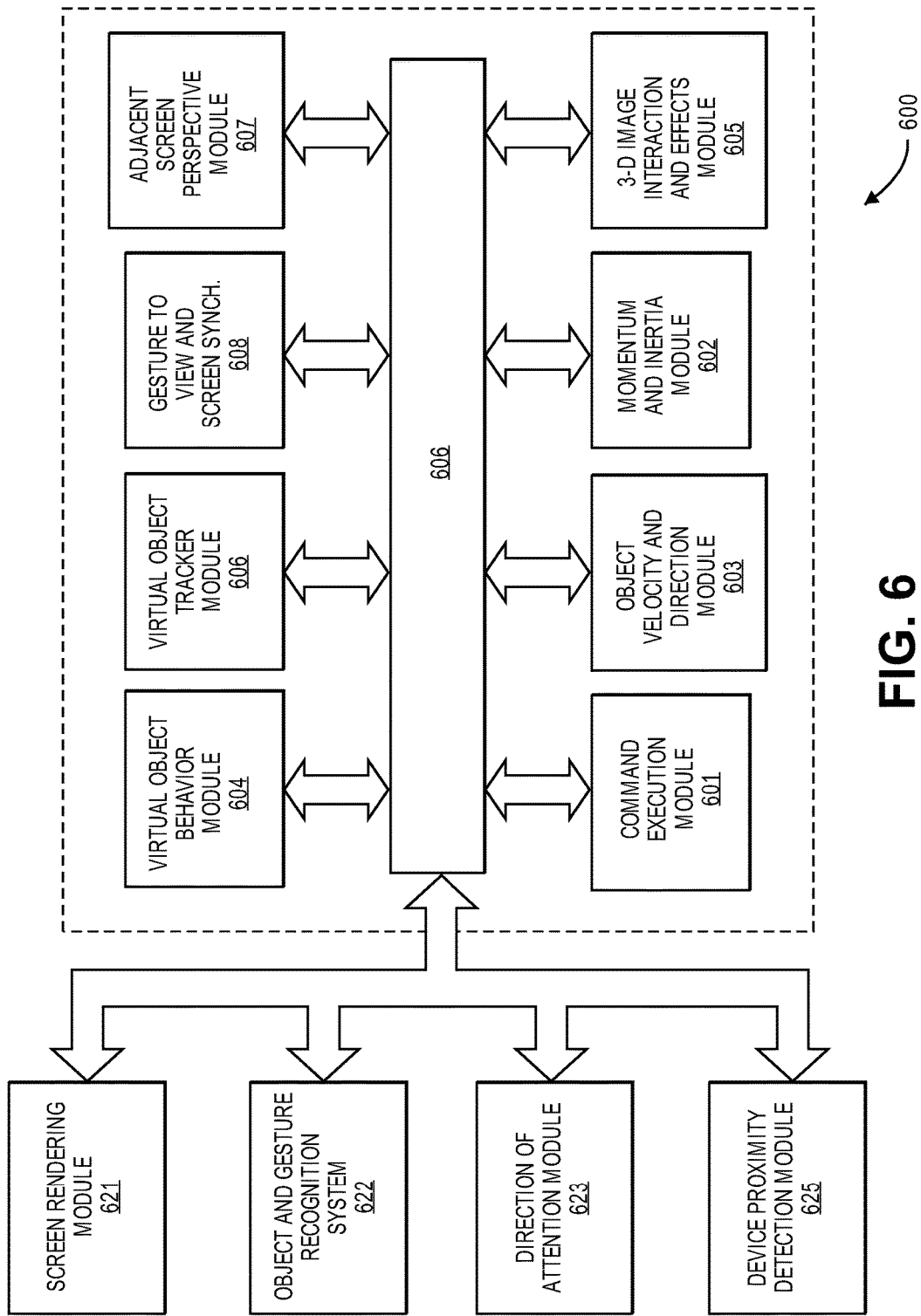
FIG. 6 illustrates a method for facilitating dynamic targeting of users and communicating of message according to one embodiment.

FIG. 6 illustrates an embodiment of a computing environment 600 capable of supporting the operations discussed above. The modules and systems can be implemented in a variety of different hardware architectures and form factors including that shown in FIG. 4.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition System 622 may be adapted to recognize and track hand and harm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition System 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three dimensional space in a vicinity of an display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition System 622. Various views of an application on one or more screens can be associated with alternative gesture libraries or a set of gesture templates for a given view. As an example in FIG. 1A a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual object's across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers.

The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition System 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate dynamic and intelligent conversion of text into real user speech, comprising: detection/reception logic to receive a textual message from a first user; evaluation logic to access a voice profile associated with the first user, wherein the voice profile includes a real voice of the first user and at least one of emotional patterns relating to the first user, context distinctions relating to the first user, and speech characteristics relating to the first user, wherein the evaluation logic is further to extract the real voice and at least one of an emotional pattern, a context distinction, and a speech characteristic based on subject matter of the textual message; and text to real-speech logic to convert the textual message into a real speech of the first user based on the voice profile including the real voice and at least one of the emotional pattern, the context distinction, and the speech characteristic.

Example 2 includes the subject matter of Example 1, further comprising preferences logic to receive and manage user preferences based on preferences inputs provided by a second user, wherein the evaluation logic is further to access the user preferences and refer to one or more of the user preferences based on the first user or the subject matter of the textual message.

Example 3 includes the subject matter of Example 1, further comprising voice profile logic to generate the voice profile, wherein generating includes receiving the real voice of the first user and packaging the real voice into the voice profile.

Example 4 includes the subject matter of Example 3, wherein the real voice is received via an audio input component including a microphone, and wherein the voice profile is generated via a voice profile application or a voice profile website.

Example 5 includes the subject matter of Example 1, further comprising emotion estimation logic to detect and estimate the emotional patterns of the first user, wherein the emotional patterns include emotional expressions of the first user when uttering a speech, wherein the emotional patters are detected using at least one of one or more cameras, one or more sensors, and one or more microphones.

Example 6 includes the subject matter of Example 1 further comprising context/characteristics logic to detect and extract context distinctions of the first user, wherein the context distinctions include one or more real-time moods of the first user, wherein the real-time moods include one or more of happy, jolly, celebratory, overjoyed, angry, sad, disturbed, feeling lonely, and defeated.

Example 7 includes the subject matter of Example 6, wherein the context/characteristics logic is further to detect and extract speech characteristics of the first user, wherein the speech characteristics include one or more features specific to the first user, wherein the speech characteristics include one or more unclear or ambiguous elements of speech, pronunciation, accent, and languages.

Example 8 includes the subject matter of Example 1, wherein the context distinctions and speech characteristics are gathered using at least one of audio components, video components, sensors, detectors, and user feedback, wherein the context distinctions are further gathered from analyzing contents of the textual message, wherein analyzing contents include evaluating an entire correspondence relating to the textual message.

Example 9 includes the subject matter of Example 3, wherein packaging comprises associating the emotional patterns, the context distinctions, and the speech characteristics of the first user with the real voice of the first user to form the voice profile corresponding to the first user.

Some embodiments pertain to Example 10 that includes a method for facilitating dynamic and intelligent conversion of text into real user speech, comprising: receiving a textual message from a first user; accessing a voice profile associated with the first user, wherein the voice profile includes a real voice of the first user and at least one of emotional patterns relating to the first user, context distinctions relating to the first user, and speech characteristics relating to the first user, wherein accessing further includes extracting the real voice and at least one of an emotional pattern, a context distinction, and a speech characteristic based on subject matter of the textual message; and converting the textual message into a real speech of the first user based on the voice profile including the real voice and at least one of the emotional pattern, the context distinction, and the speech characteristic.

Example 11 includes the subject matter of Example 10, further comprising receiving and managing user preferences based on preferences inputs provided by a second user, wherein accessing further includes accessing the user preferences and refer to one or more of the user preferences based on the first user or the subject matter of the textual message.

Example 12 includes the subject matter of Example 10 or 11, further comprising generating the voice profile, wherein generating includes receiving the real voice of the first user and packaging the real voice into the voice profile.

Example 13 includes the subject matter of Example 12, wherein the real voice is received via an audio input component including a microphone, and wherein the voice profile is generated via a voice profile application or a voice profile website.

Example 14 includes the subject matter of Example 10, further comprising detecting and estimating the emotional patterns of the first user, wherein the emotional patterns include emotional expressions of the first user when uttering a speech, wherein the emotional patters are detected using at least one of one or more cameras, one or more sensors, and one or more microphones.

Example 15 includes the subject matter of Example 10, further comprising detecting and extracting context distinctions of the first user, wherein the context distinctions include one or more real-time moods of the first user, wherein the real-time moods include one or more of happy, jolly, celebratory, overjoyed, angry, sad, disturbed, feeling lonely, and defeated.

Example 16 includes the subject matter of Example 10 or 15, further comprising detecting and extracting speech characteristics of the first user, wherein the speech characteristics include one or more features specific to the first user, wherein the speech characteristics include one or more unclear or ambiguous elements of speech, pronunciation, accent, and languages.

Example 17 includes the subject matter of Example 10, wherein the context distinctions and speech characteristics are gathered using at least one of audio components, video components, sensors, detectors, and user feedback, wherein the context distinctions are further gathered from analyzing contents of the textual message, wherein analyzing contents include evaluating an entire correspondence relating to the textual message.

Example 18 includes the subject matter of Example 12, wherein packaging comprises associating the emotional patterns, the context distinctions, and the speech characteristics of the first user with the real voice of the first user to form the voice profile corresponding to the first user.

Some embodiments pertain to Example 19 includes a system comprising a storage device having instructions, and a processor to execute the instructions to facilitate a mechanism to perform one or more operations comprising: receiving a textual message from a first user; accessing a voice profile associated with the first user, wherein the voice profile includes a real voice of the first user and at least one of emotional patterns relating to the first user, context distinctions relating to the first user, and speech characteristics relating to the first user, wherein accessing further includes extracting the real voice and at least one of an emotional pattern, a context distinction, and a speech characteristic based on subject matter of the textual message; and converting the textual message into a real speech of the first user based on the voice profile including the real voice and at least one of the emotional pattern, the context distinction, and the speech characteristic.

Example 20 includes the subject matter of Example 19, wherein the one or more operations further comprise receiving and managing user preferences based on preferences inputs provided by a second user, wherein accessing further includes accessing the user preferences and refer to one or more of the user preferences based on the first user or the subject matter of the textual message.

Example 21 includes the subject matter of Example 19 or 20, wherein the one or more operations further comprise generating the voice profile, wherein generating includes receiving the real voice of the first user and packaging the real voice into the voice profile.

Example 22 includes the subject matter of Example 21, wherein the real voice is received via an audio input component including a microphone, and wherein the voice profile is generated via a voice profile application or a voice profile website.

Example 23 includes the subject matter of Example 19, wherein the one or more operations further comprise detecting and estimating the emotional patterns of the first user, wherein the emotional patterns include emotional expressions of the first user when uttering a speech, wherein the emotional patters are detected using at least one of one or more cameras, one or more sensors, and one or more microphones.

Example 24 includes the subject matter of Example 19, wherein the one or more operations further comprise detecting and extracting context distinctions of the first user, wherein the context distinctions include one or more real-time moods of the first user, wherein the real-time moods include one or more of happy, jolly, celebratory, overjoyed, angry, sad, disturbed, feeling lonely, and defeated.

Example 25 includes the subject matter of Example 19 or 24, wherein the one or more operations further comprise detecting and extracting speech characteristics of the first user, wherein the speech characteristics include one or more features specific to the first user, wherein the speech characteristics include one or more unclear or ambiguous elements of speech, pronunciation, accent, and languages.

Example 26 includes the subject matter of Example 19, wherein the context distinctions and speech characteristics are gathered using at least one of audio components, video components, sensors, detectors, and user feedback, wherein the context distinctions are further gathered from analyzing contents of the textual message, wherein analyzing contents include evaluating an entire correspondence relating to the textual message.

Example 27 includes the subject matter of Example 21, wherein packaging comprises associating the emotional patterns, the context distinctions, and the speech characteristics of the first user with the real voice of the first user to form the voice profile corresponding to the first user.

Some embodiments pertain to Example 28 includes an apparatus comprising: means for receiving a textual message from a first user; means for accessing a voice profile associated with the first user, wherein the voice profile includes a real voice of the first user and at least one of emotional patterns relating to the first user, context distinctions relating to the first user, and speech characteristics relating to the first user, wherein accessing further includes extracting the real voice and at least one of an emotional pattern, a context distinction, and a speech characteristic based on subject matter of the textual message; and means for converting the textual message into a real speech of the first user based on the voice profile including the real voice and at least one of the emotional pattern, the context distinction, and the speech characteristic.

Example 29 includes the subject matter of Example 28, further comprising means for receiving and managing user preferences based on preferences inputs provided by a second user, wherein accessing further includes accessing the user preferences and refer to one or more of the user preferences based on the first user or the subject matter of the textual message.

Example 30 includes the subject matter of Example 28 or 29, further comprising means for generating the voice profile, wherein generating includes receiving the real voice of the first user and packaging the real voice into the voice profile.

Example 31 includes the subject matter of Example 30, wherein the real voice is received via an audio input component including a microphone, and wherein the voice profile is generated via a voice profile application or a voice profile website.

Example 32 includes the subject matter of Example 28, further comprising means for detecting and estimating the emotional patterns of the first user, wherein the emotional patterns include emotional expressions of the first user when uttering a speech, wherein the emotional patters are detected using at least one of one or more cameras, one or more sensors, and one or more microphones.

Example 33 includes the subject matter of Example 28, wherein the one or more operations further comprise detecting and extracting context distinctions of the first user, wherein the context distinctions include one or more real-time moods of the first user, wherein the real-time moods include one or more of happy, jolly, celebratory, overjoyed, angry, sad, disturbed, feeling lonely, and defeated.

Example 34 includes the subject matter of Example 28 or 33, further comprising means for detecting and extracting speech characteristics of the first user, wherein the speech characteristics include one or more features specific to the first user, wherein the speech characteristics include one or more unclear or ambiguous elements of speech, pronunciation, accent, and languages.

Example 35 includes the subject matter of Example 28, wherein the context distinctions and speech characteristics are gathered using at least one of audio components, video components, sensors, detectors, and user feedback, wherein the context distinctions are further gathered from analyzing contents of the textual message, wherein analyzing contents include evaluating an entire correspondence relating to the textual message.

Example 36 includes the subject matter of Example 30, wherein packaging comprises associating the emotional patterns, the context distinctions, and the speech characteristics of the first user with the real voice of the first user to form the voice profile corresponding to the first user.

Example 37 includes at least one non-transitory machine-readable medium comprising a plurality of instructions, when executed on a computing device, to implement or perform a method as claimed in any of claims or examples 10-18.

Example 38 includes at least one machine-readable medium comprising a plurality of instructions, when executed on a computing device, to implement or perform a method as claimed in any of claims or examples 10-18.

Example 39 includes a system comprising a mechanism to implement or perform a method as claimed in any of claims or examples 10-18.

Example 40 includes an apparatus comprising means for performing a method as claimed in any of claims or examples 10-18.

Example 41 includes a computing device arranged to implement or perform a method as claimed in any of claims or examples 10-18.

Example 42 includes a communications device arranged to implement or perform a method as claimed in any of claims or examples 10-18.

Example 43 includes at least one machine-readable medium comprising a plurality of instructions, when executed on a computing device, to implement or perform a method or realize an apparatus as claimed in any preceding claims or examples.

Example 44 includes at least one non-transitory machine-readable medium comprising a plurality of instructions, when executed on a computing device, to implement or perform a method or realize an apparatus as claimed in any preceding claims or examples.

Example 45 includes a system comprising a mechanism to implement or perform a method or realize an apparatus as claimed in any preceding claims or examples.

Example 46 includes an apparatus comprising means to perform a method as claimed in any preceding claims or examples.

Example 47 includes a computing device arranged to implement or perform a method or realize an apparatus as claimed in any preceding claims or examples.

Example 48 includes a communications device arranged to implement or perform a method or realize an apparatus as claimed in any preceding claims or examples.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
a memory;
a user device having a processor coupled to the memory, and an input coupled to the processor to receive a textual message from a first user;
wherein the processor is configured to access a voice profile associated with the first user stored in the memory, wherein the voice profile includes data gathered using any one or more of audio components, microphones, video components, cameras, sensors, and detectors of the user device and user feedback received in the user device, the data including audio data encoding recorded sound of a real voice of the first user, data representing a plurality of emotional patterns relating to the first user, context distinctions relating to the first user, and speech characteristics relating to the first user, wherein the processor is further configured to extract the real voice and at least one of the emotional patterns, the context distinctions, and the speech characteristics from the voice profile based on subject matter of the textual message received from the first user; and wherein the processor is further configured to convert the textual message into a real speech using the real voice and at least one of the emotional patterns, the context distinctions and the speech characteristics extracted from the voice profile of the first user in accordance with user preferences stored in the memory related to textual messages, including any one or more of a type of the textual message, a time of day that the textual message was received, an identity of a sender of the textual message, a status of the textual message, wherein converting is based on the voice profile including the real voice and at least one of the emotional patterns, the context distinctions, and the speech characteristics, the real speech encoding sound capable of playback using an audio component of the user device.

2. The apparatus of claim 1, wherein the user preferences stored in the memory related to the textual messages include the identity of the sender of the textual message, and wherein the processor is further configured to receive and manage the user preferences based on preferences inputs received from a second user, wherein the processor is further configured to access one or more of the user preferences based on the any one of the voice profile of the first user or the subject matter of the textual message.

3. The apparatus of claim 1, wherein the processor is further configured to receive the real voice of the first user and to package the real voice into the voice profile.

4. The apparatus of claim 3, wherein the real voice is received via an audio input component including a microphone, and wherein the voice profile is generated by the processor interoperating with a voice profile application implemented on the user device or a voice profile website in communication with the user device.

5. The apparatus of claim 1, wherein the processor is further configured to detect and estimate the emotional patterns of the first user, wherein the emotional patterns include emotional expressions of the first user when uttering a speech, wherein the emotional patterns are received using the any one or more cameras, one or more sensors, and one or more microphones of the user device.

6. The apparatus of claim 1, wherein the processor is further configured to detect and extract context distinctions of the first user, wherein the context distinctions include one or more real-time moods of the first user, wherein the real-time moods include one or more of happy, jolly, celebratory, overjoyed, angry, sad, disturbed, feeling lonely, and defeated.

7. The apparatus of claim 6, wherein the processor is further configured to detect and extract speech characteristics of the first user, wherein the speech characteristics include one or more features specific to the first user, wherein the speech characteristics include one or more unclear or ambiguous elements of speech, pronunciation, accent, and languages.

8. The apparatus of claim 1, wherein the processor is configured to gather data representing the context distinctions and speech characteristics using the any one or more audio components, microphones, video components, cameras, sensors, detectors, and user feedback received in the user device, wherein the context distinctions are determined from analyzing contents of the textual message, wherein analyzing contents include evaluating an entire correspondence relating to the textual message.

9. The apparatus of claim of claim 3, wherein packaging the real voice into the voice profile includes associating any one or more of the emotional patterns, the context distinctions, and the speech characteristics of the first user with the real voice of the first user to form the voice profile corresponding to the first user.

10. A computer-implemented method comprising:
responsive to receiving a textual message from a first user in a user device, accessing a voice profile associated with the first user, wherein the voice profile comprises data gathered using any one or more of audio components, microphones, video components, cameras, sensors, and detectors of the user device and user feedback received in the user device, the gathered data including audio data representing a real voice of the first user and data representing a plurality of emotional patterns relating to the first user, context distinctions relating to the first user, and speech characteristics relating to the first user, wherein accessing the voice profile further includes extracting the real voice and at least one of the emotional patterns, the context distinctions, and the speech characteristic based on subject matter of the textual message received from the first user; and converting the textual message into a real speech using the real voice and at least one of the emotional patterns, the context distinctions and the speech characteristics extracted from the voice profile of the first user in accordance with user preferences stored in the user device related to textual messages, including any one or more of a type of the textual message, a time of day that the textual message was received, an identity of a sender of the textual message, a status of the textual message, wherein converting is based on the voice profile including the real voice and at least one of the emotional patterns, the context distinctions, and the speech characteristics, the real speech comprising audio data capable of playback using an audio component of the user device.

11. The method of claim 10, wherein the user preferences stored in the user device related to the textual messages include the identity of the sender of the textual message, and wherein the method further comprises receiving and managing user preferences in the user device based on preferences inputs received from a second user, wherein accessing the voice profile further includes accessing one or more of the user preferences based on the any one of the voice profile of the first user or the subject matter of the textual message.

12. The method of claim 10, further comprising generating the voice profile, wherein generating includes receiving the real voice of the first user and packaging the real voice into the voice profile.

13. The method of claim 12, wherein the real voice is received via an audio input component including a microphone, and wherein the voice profile is generated using a voice profile application implemented on the user device or a voice profile website in communication with the user device.

14. The method of claim 10, further comprising detecting and estimating the emotional patterns of the first user, wherein the emotional patterns include emotional expressions of the first user when uttering a speech, wherein the emotional patterns are detected using the any one or more cameras, one or more sensors, and one or more microphones of the user device.

15. The method of claim 10, further comprising detecting and extracting context distinctions of the first user, wherein the context distinctions include one or more real-time moods of the first user, wherein the real-time moods include one or more of happy, jolly, celebratory, overjoyed, angry, sad, disturbed, feeling lonely, and defeated.

16. The method of claim 15, further comprising detecting and extracting speech characteristics of the first user, wherein the speech characteristics include one or more features specific to the first user, wherein the speech characteristics include one or more unclear or ambiguous elements of speech, pronunciation, accent, and languages.

17. The method of claim 10, wherein the data representing the context distinctions and speech characteristics are gathered using the any one or more audio components, video components, sensors, detectors, and user feedback, wherein the context distinctions are further determined from analyzing contents of the textual message, wherein analyzing contents include evaluating an entire correspondence relating to the textual message.

18. The method of claim 12, wherein packaging the real voice into the voice profile includes associating any one or more of the emotional patterns, the context distinctions, and the speech characteristics of the first user with the real voice of the first user to form the voice profile corresponding to the first user.

19. At least one machine-readable non-transitory medium comprising a plurality of instructions, executed on a computing device, to facilitate the computing device to perform one or more operations comprising:

responsive to receiving a textual message from a first user, accessing a voice profile associated with the first user, wherein the voice profile comprises data gathered using any one or more of audio components, microphones, video components, cameras, sensors and detectors of a user device and user feedback received in the user device, the gathered data including audio data representing a real voice of the first user and data representing a plurality of emotional patterns relating to the first user, context distinctions relating to the first user, and speech characteristics relating to the first user, wherein accessing the voice profile further includes extracting the real voice and at least one of the emotional patterns, the context distinctions, and the speech characteristics based on subject matter of the textual message received from the first user; and converting the textual message into a real speech using the real voice and at least one of the emotional patterns, the context distinctions and the speech characteristics extracted from the voice profile of the first user in accordance with user preferences stored in the user device related to textual messages, including any one or more of a type of the textual message, a time of day that the textual message was received, an identity of a sender of the textual message, a status of the textual message, wherein converting is based on the voice profile including the real voice and at least one of the emotional patterns, the context distinctions, and the speech characteristics, the real speech comprising audio data capable of playback using an audio component of the user device.

20. The machine-readable non-transitory medium of claim 19, wherein the user preferences stored in the user device related to the textual messages include the identity of the sender of the textual message, and wherein the machine-readable non-transitory medium further comprises receiving and managing user preferences in the user device based on preferences inputs received from a second user, wherein accessing the voice profile further includes accessing one or more of the user preferences based on the any one of the voice profile of the first user or the subject matter of the textual message.

21. The machine-readable non-transitory medium of claim 19, further comprising generating the voice profile, wherein generating includes receiving the real voice of the first user and packaging the real voice into the voice profile, wherein the real voice is received via an audio input component including a microphone, and wherein the voice profile is generated using a voice profile application implemented on the user device or a voice profile website in communication with the user device.

22. The machine-readable non-transitory medium of claim 19, further comprising detecting and estimating the emotional patterns of the first user, wherein the emotional patterns include emotional expressions of the first user when uttering a speech, wherein the emotional patterns are detected using the any one or more cameras, one or more sensors, and one or more microphones of the user device.

23. The machine-readable non-transitory medium of claim 19, further comprising detecting and extracting context distinctions of the first user, wherein the context distinctions include one or more real-time moods of the first user, wherein the real-time moods include one or more of happy, jolly, celebratory, overjoyed, angry, sad, disturbed, feeling lonely, and defeated.

24. The machine-readable non-transitory medium of claim 23, further comprising detecting and extracting speech characteristics of the first user, wherein the speech characteristics include one or more features specific to the first user, wherein the speech characteristics include one or more unclear or ambiguous elements of speech, pronunciation, accent, and languages.

25. The machine-readable non-transitory medium of claim 19, wherein the data representing the context distinctions and speech characteristics are gathered using the any one or more audio components, video components, sensors, detectors, and user feedback, wherein the context distinctions are further determined from analyzing contents of the textual message, wherein analyzing contents include evaluating an entire correspondence relating to the textual message, wherein packaging the real voice into the voice profile includes associating any one or more of the emotional patterns, the context distinctions, and the speech characteristics of the first user with the real voice of the first user to form the voice profile corresponding to the first user.

* * * * *